(12) United States Patent
Sekine

(10) Patent No.: US 11,113,904 B2
(45) Date of Patent: Sep. 7, 2021

(54) ON-ROAD RUNNING TEST SYSTEM

(71) Applicant: HORIBA, LTD., Kyoto (JP)

(72) Inventor: Daisuke Sekine, Kyoto (JP)

(73) Assignee: HORIBA, LTD., Kyoto (JP)

( * ) Notice: Subject to any disclaimer, the term of this patent is extended or adjusted under 35 U.S.C. 154(b) by 244 days.

(21) Appl. No.: 16/415,890

(22) Filed: May 17, 2019

(65) Prior Publication Data

US 2019/0355189 A1 Nov. 21, 2019

(30) Foreign Application Priority Data

May 21, 2018 (JP) .............................. JP2018-097261

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
CPC .............. G07C 5/0808; G07C 5/0816; B60W 2540/10; B60W 2540/12; B60W 2540/14; B60W 2540/16; B60W 50/14; B60W 2050/041; B60W 40/09; G01M 17/06; G01M 15/102
See application file for complete search history.

(56) References Cited

U.S. PATENT DOCUMENTS

2015/0332521 A1   11/2015   Uratani et al.

FOREIGN PATENT DOCUMENTS

| CN | 105938052 A | 9/2016 |
| EP | 0592134 A2 | 4/1994 |
| JP | 2016001171 A | 1/2016 |
| WO | 2017207463 A1 | 12/2017 |

OTHER PUBLICATIONS

EESR dated Oct. 21, 2019 issued for European Patent Application No. 19 174 609.8, 8 pgs.

*Primary Examiner* — Michael V Kerrigan
(74) *Attorney, Agent, or Firm* — Brooks Kushman P.C.

(57) ABSTRACT

Provided is an on-road running test system including: a running data acquisition part that successively acquires pieces of actual running data on a vehicle on which a driver performs a running test on a road; a calculation part that compares predetermined test conditions for the running test and the pieces of actual running data to calculate a driving operation style including at least one of an accelerator operation mode, a brake operation mode, and a shift operation mode for satisfying the test conditions; and a presentation part that presents the driving operation style to the driver.

11 Claims, 5 Drawing Sheets

ON-ROAD RUNNING TEST SYSTEM

CROSS-REFERENCE TO RELATED APPLICATIONS

This application claims priority on Japanese Patent Application No. 2018-097261 filed on May 21, 2018, the disclosure of which is incorporated by reference herein.

TECHNICAL FIELD

The present disclosure relates to an on-road vehicle running test stem used when performing a running test of a vehicle on a road such as a public road.

BACKGROUND ART

In the on-road exhaust gas certification test (Real Driving Emissions: RDE) started in 2017 in Europe, an on-road running test system also called PEMS (vehicle-mounted exhaust gas measuring instrument) is mounted in a vehicle to perform an actual road running test in an urban area or the like, and emissions are measured. It is stipulated that when performing the test, arbitrary running is not permitted, and driving must be performed in a running mode conforming to predetermined test conditions.

As the test conditions, at the moment, for example, a running time and the trip composition (the running ratio among an urban area, a suburb area, and an expressway) are stipulated, and in addition, as a test condition concerning emissions, it is stipulated that measured results by the Moving Averaging Window (MAW) method, the power binning method, or the Standardized Power Frequency (SPF) distribution method must respectively fall within predetermined ranges. Further, only upon completion of a running test satisfying these test conditions, the test comes into effect.

In addition, although Japan, United States, China, and other countries are currently considering incorporating the above-described actual road running test in corresponding regulations, test conditions for the test are thought to be different among the countries.

Also, in the conventional on-road running test system, as described in Patent Literature 1 and other such literature, during the running test, pieces of intermediate data on the degree of progress of the test and the like up to that point in time, such as an evaluated value by the MAW method, a calculated result by the power binning method, or the trip composition, are adapted to be displayed in real time to a driver graphically or in numerical values so as to enable driving satisfying the above-described test conditions to be performed.

CITATION LIST

Patent Literatures

Patent Literature 1: Japanese Unexamined Patent Application Publication No. 2016-1171

SUMMARY

Technical Problem

However, such pieces of intermediate data are only various types of measurement data obtained as a result of operating a vehicle up to that point in time during the running test, and therefore a driver views the pieces of intermediate data and has to drive while, in addition to driving operations (accelerator operations, brake operations, and shift operation) to be performed from now, determining the selection/change of a running route, and the like every moment.

Accordingly, it is no surprise that the driver requires skills for the running test, and in addition, when performing the actual running test, the fact is that an assistant familiar with the running test rides together in a vehicle, and gives driving instructions to the driver while viewing the pieces of intermediate data.

The present invention has been made in consideration of such a problem, and a main desired object thereof is to make it possible to perform running satisfying the test conditions in the on-road exhaust gas certification test easily and even by a driver alone without learning any special skills.

Solution to Problem

That is, an on-road vehicle running test system according to an embodiment of the present invention includes; a running data acquisition part that successively acquires pieces of actual running data on a vehicle on which a driver performs a running test on a road; a calculation part that compares predetermined test conditions for the running test and the pieces of actual running data to calculate a driving operation style including at least one of an accelerator operation mode (hereinafter also referred to as accelerator work), a brake operation mode (hereinafter also referred to as brake work), and a shift operation mode (hereinafter also referred to as shift work) recommended for satisfying the test conditions; and a presentation part that presents the driving operation style to the driver.

Note that the driving operation style may include, not only the above-described modes of a pedal operation by the driver, but also vehicle behavior modes that can be directly perceived by the driver through the operation or can be directly set as operation targets, such as speed, acceleration, and engine rotation speed.

In order to make it possible for anyone to more easily and surely perform the running test so as to satisfy the test conditions, it is desirable that the calculation part is one that further calculates a running route recommended for satisfying the test conditions, and the presentation part is one that further presents the running route to the driver.

Practical specific embodiments preferably include one in which the calculation part is one that calculates a driving operation style or a running route recommended for satisfying at least one of Trip Composition, MAW and SPF among the test conditions.

Although the trip composition, MAW and SPF may be different depending on regulations of each country or time; a description will be given using an example examined in Japan. In the trip composition, it is necessary to perform an on-road run in three vehicle speed categories (low speed, medium speed, and high speed) corresponding to Urban (urban area). Rural (suburb area), and Motorway (expressway). In addition, it is also necessary to satisfy the minimum running distance in each of the vehicle speed categories and a running distance ratio or running time ratio determined for each of the vehicle speed categories.

The MAW (moving averaging window) method is one that continuously measures the emission rate of exhaust gas per unit distance for evaluation. For example, the method determines validity by successively plotting the emission amount of $CO_2$ per unit distance, and over the unit distance, for example, an average vehicle speed in a graph with the $CO_2$ emission amount and the average vehicle speed as the vertical and horizontal axes, respectively; and displaying the two-dimensional amounts of the $CO_2$ emission amount and the average vehicle speed as trend data. For example, with the point in time when the integrated value of the $CO_2$ emission amount from the exhaust gas obtained in each of the vehicle speed categories corresponding to the urban area (Urban), suburb area (Rural), and expressway (Motorway) during an on-road run reaches ½ of a $CO_2$ amount emitted when a run is performed in accordance with WLTC as 1 Window, the moving average value of pieces of data included in Window is calculated every one second. Then, on the $CO_2$ characteristic curve based on the WLTC standard, Window data consisting of a pair of a $CO_2$ average value and an average vehicle speed calculated in each Window is plotted. Further, a measured value is weighted depending on a deviation (25%, 50%) from the $CO_2$ characteristic curve, and the emission amounts of each gas are calculated respectively in the urban area, in the suburb area, and on the expressway, and then integrated. In the MAW method, as a condition for determining that an on-road test is valid, 15% or more of the total Window data number has to be included in, each of the vehicle speed categories corresponding to the urban area, suburb area, and expressway. Also, 50% or more of Window data in each of the vehicle speed categories has to be included within Tolerance 1 indicating±25% of the $CO_2$ characteristic curve calculated from the WLTC data.

Further, in the SPF (standardized power frequency distribution) method, the moving average of multiple successive points in time-series data on a measured value such as component concentration of exhaust gas is treated as an actual measured value. Whether or not an on-road running test satisfies measurement criteria is determined on the basis of the magnitude distribution of power supposed to be outputted by a vehicle. For example, test data at the time of an on-road run is acquired every three seconds to calculate the moving averages of emission gas, tire driving force, and vehicle speed. Each calculated average data is classified into nine power classes set from vehicle specifications, and for each of the power classes, the average values of the emission gas and the vehicle speed are calculated. Then, each average value calculated for each of the power Classes is weighted (the weighting is provided in Normalized standard power frequency (standard power frequency table)), and values in all the power classes are integrated. Then, from the integrated emission gas and speed, an emission amount per distance is calculated. In the SPF method, as a condition for determining that an on-road test is valid, the acquisition of five or more data points is required in each of the power classes.

AI (Artificial Intelligence) may be used for the calculation part. In that case, the calculation part desirably has a function of being inputted with pieces of actual running data in multiple past running tests and evaluation values of the pieces of actual running data based on the test conditions and performing machine learning of the correlation between them, and only has to calculate the driving operation style on the basis of the correlation.

When a running route is changed, a driving operation style has to be changed sometimes, and in that case, preferably, the calculation part is one that, every time a running route is changed, calculates a driving operation style at the time of running on the resulting running route.

More desirable embodiments include one in which the calculation part is one that, determines a driving operation style depending on a surrounding road situation, and calculates a running route depending on the resulting driving operation style.

Advantageous Effects

According to the embodiment of the present invention configured as described above, in the on-road exhaust gas certification test, a driving operation style recommended for satisfying the test conditions is automatically calculated and presented to a driver, and therefore the driver can perform the on-road exhaust gas certification test easily and even alone without learning any special skills.

DESCRIPTION OF EMBODIMENTS

In the following, one embodiment of the present invention will be described with reference to the drawings.

Figure 1:
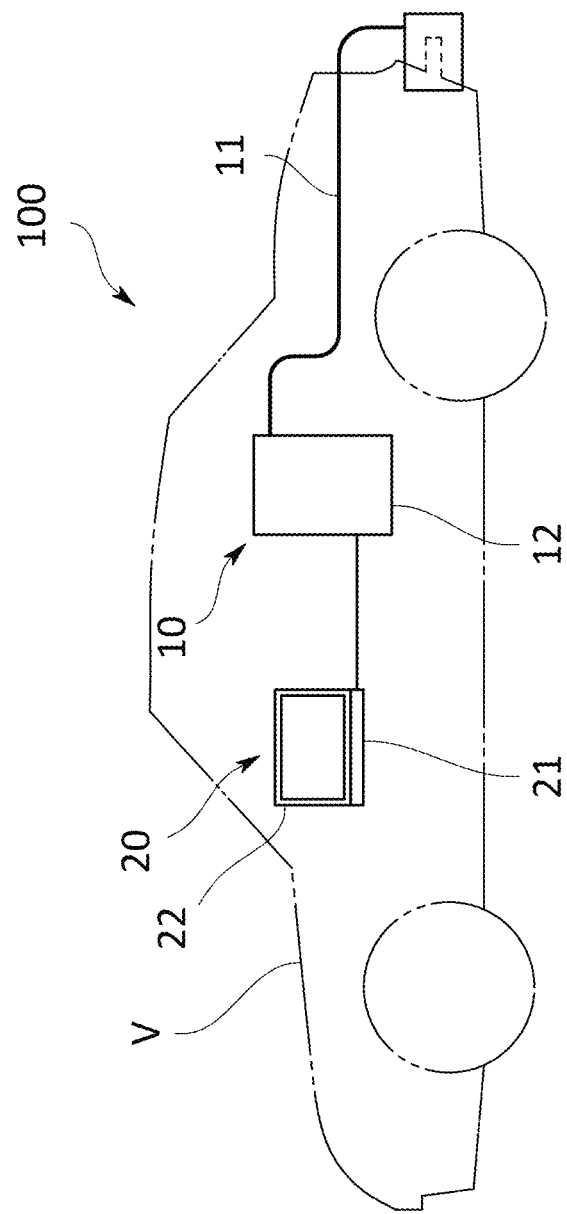
FIG. 1 is a schematic diagram illustrating the overall configuration of an on-road running test system in the present embodiment.

An on-road running test system 100 according to the present embodiment is one used for an on-road exhaust gas certification test (corresponding to a running test in claims, and hereinafter also referred to as RDE), and as illustrated in FIG. 1, adapted to include: a vehicle-mounted exhaust gas analyzer 10 mounted in a vehicle V having an internal combustion engine; and an information processor 20 communicatively connected to the vehicle-mounted exhaust gas analyzer 10.

As illustrated in FIG. 1, the vehicle-mounted, exhaust gas analyzer 10 is one including: a hose 11 for introducing part of exhaust gas from a tail pipe of the vehicle V and an analyzer main body 12 for analyzing the exhaust gas introduced through the hose 11, and the analyzer main body 12 measures an exhaust gas flow rate, the amounts (or concentrations) of CO, $CO_2$, $H_2O$, $NO_x$, THC, PN, PM, and the like contained in the exhaust gas, and the like, and further calculates a fuel consumption from them.

The information processor 20 is a general-purpose computer including a processor main body 21 incorporating a CPU, a memory, communication ports, and the like; input means (not illustrated) such as a key board; and a display 22, and as with the exhaust gas analyzer 10, mounted in the interior of the vehicle.

Figure 2:
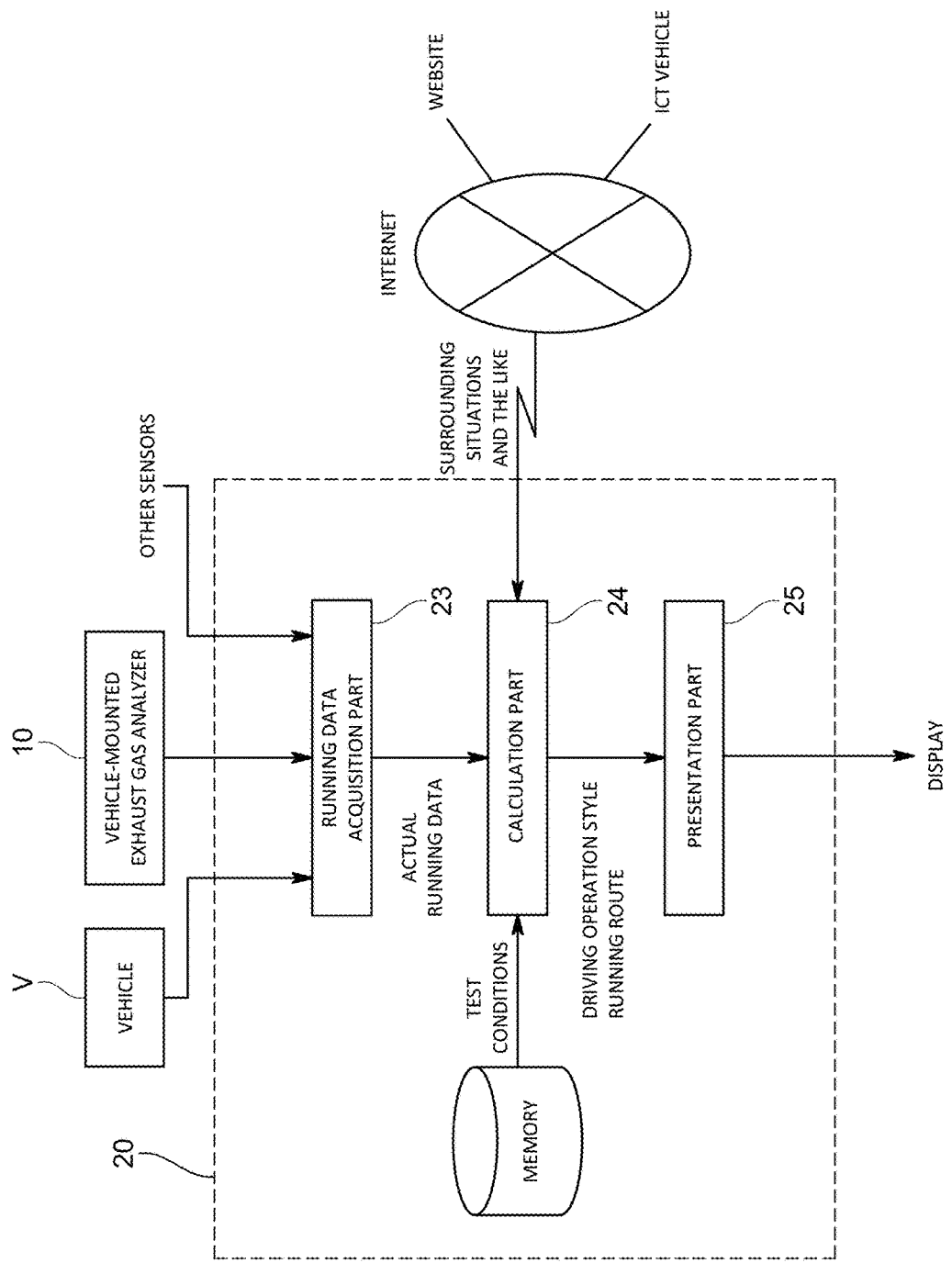
FIG. 2 is a functional block diagram illustrating functions of an information processor in the same embodiment.

In addition, the information processor 20 operates in accordance with a predetermined program stored in the memory, and thereby as illustrated in FIG. 2, fulfills functions as: a running data acquisition part 23 that successively acquires pieces of actual running data on the vehicle during the RDE; a calculation part 24 that calculates a driving operation style and a desired running route recommended for satisfying predetermined test conditions stipulated in the RDE; and a presentation part 25 that presents the driving operation style and the running route to a driver.

Next, the respective parts will be described.

The running data acquisition part 23 is one that successively acquires the pieces of actual running data from the ECU, TCU, and the like of the vehicle V, from the exhaust gas analyzer, and from sensors attached to the vehicle, such as GPS and a thermometer respectively via communication ports at predetermined sampling times, as well as successively stores and, accumulates them in a running data storage part (not illustrated) set in a predetermined area of the memory.

An example of the types and acquisition destinations of the pieces of actual running data is shown in the following table.

TABLE 1

| Actual running data | Acquisition destinations |
| --- | --- |
| THC concentration | Analyzer |
| CH4 concentration | Analyzer |
| NMHC concentration | Analyzer |
| CO concentration | Analyzer |
| CO2 concentration | Analyzer |
| NOx concentration | Analyzer |
| PM concentration | Analyzer |
| Exhaust mass flow rate | Analyzer |
| Ambient humidity | Vehicle sensors |
| Ambient temperature | Vehicle sensors |
| Ambient pressure | Vehicle sensors |
| Vehicle speed | Vehicle sensors, GPS, or ECU |
| Vehicle position (latitude and longitude of vehicle) | GPS |
| Altitude of vehicle | Vehicle sensors, GPS, or ECU |
| Exhaust gas temperature | Vehicle sensors |
| Engine coolant temperature | Vehicle sensors or ECU |
| Engine rotation speed | Vehicle sensors or ECU |
| Engine torque | Vehicle sensors or ECU |
| Torque at driving axle | Rim torque meter |
| Pedal position (including on/off, stepping degree) | Vehicle sensors or ECU |
| Engine fuel flow rate | Vehicle sensors or ECU |
| Air flow rate at engine inlet | Vehicle sensors or ECU |
| Failure status | ECU |
| Inlet flow temperature | Vehicle sensors or ECU |
| Reproduction status | ECU |
| Engine oil temperature | Vehicle sensors or ECU |
| Actual gear | ECU |
| Desired gear (e.g., gear shift indicator) | ECU |

In addition, the running data acquisition part 23 sometimes calculates directly unobtainable actual running data from the values of other pieces of actual running data. For example, there is a case where, when engine torque is unobtainable, the engine torque is calculated from an engine rotation speed and a throttle opening level with reference to a torque-rotation speed map stored in the memory.

Other pieces of actual running data include, for example, a shift position, vehicle acceleration, catalyst temperature, fuel consumption, and the like.

The calculation part 24 is one that compares the test conditions preliminarily stored in a predetermined area of the memory and the pieces of actual running data, further adds surrounding situations (such as a speed limit, congestion, and the speed of a preceding running vehicle) of a road on which the vehicle is currently running, and calculates the driving operation style recommended for satisfying the test conditions as described above.

The term "driving operation style" here includes the accelerator work and the brake work in the case of automatic transmission vehicles, and is represented in numerical values here. Also, a running speed, the degree of acceleration, an engine rotation speed, and the like directly controllable by the accelerator work and the brake work are also included in the driving operation style. In addition, in the case of vehicles whose gears are manually shiftable, the shift work may be included in the driving operation style. Also, the recommended driving style is not only one but may include an allowable range. For example, when a driving operation style of 'accelerator 80%' is calculated, the degree of stepping on the accelerator pedal may be set within an allowable range of, for example, 70% to 90 which are before and after 80%.

To calculate the driving operation style, machine learning (AI) is used here. AI has been inputted with and learned pieces of actual running data (All or part of parameters listed in Table 1 is also acceptable) in multiple past running tests, and corresponding test results as pieces of teaching data, and stores the correlation between them as pieces of correlation data (i.e., pieces of learned data) in the memory. Further, in light of the correlation indicated by the pieces of correlation data, from the pieces of actual running data measured up to now, the AI calculates a current driving operation style recommended for obtaining pieces of actual running data satisfying the test conditions. The test results are ones including any one or more of the pass/fail of the test conditions, result data on, the trip composition, an evaluation value by the MAW method, and an evaluation value by the SPF.

In addition, to calculate the pieces of correlation data by the machine learning, without using the above-described pieces of actual running data or all or part of the below-described surrounding situations as the parameters for the correlation calculation, pieces of actual data or surrounding situations strongly affecting (highly related to) the test results may be extracted. Also, the pieces of correlation data may be ones calculated by the calculation part 24 itself, or alternatively may be ones preliminarily calculated by one other learning device for only performing correlation calculation. In the latter case, the pieces of correlation data indicating the correlation preliminarily calculated by the one other learning device may be received via a network or the like and stored in the memory. Then, pieces of new correlation data may be received from the one other learning device every predetermined period, and the pieces of correlation data stored in the memory may be periodically updated.

In addition, independently of AI, from the pieces of actual running data measured up to now, information insufficient for satisfying the test conditions may be calculated to calculate the driving operation style on the basis of the information. For example, in the trip composition, when the ratio of a suburb area running speed is lower than that stipulated in the test conditions, for example, when a current running speed is lower than the stipulated suburb area running speed, the degree of stepping on the acceleration pedal or speed having a higher value than a current value is calculated as the driving operation style. Also, during an urban area running, when the MAE values converge to higher values, the degree or variation of stepping on the acceleration pedal is set to a small value than a current value. Regarding the calculation, it is only necessary to obtain the value through experiment or the like from the pieces of past actual running data.

In the present embodiment, the above-described driving operation style is adapted to be successively calculated at predetermined time intervals during the RDE, and automatically updated every time in addition to this, the driving operation style may be calculated when some event occurs (e.g., when instruction input indicating calculation of the driving operation style is received from the driver or an operator riding together or when a running route is changed), or only when such an event occurs.

Also, the calculation part 24 acquires road traffic information, which is one of the surrounding situations, to refer to it, and thereby as described above, also calculates a running route desired for satisfying the test conditions. For example, in an area where congestion occurs, running at an assumed speed or the like may be difficult, and therefore in order to satisfy the test conditions, the driving operation style has to be changed, such as setting a running route avoiding the area. Therefore, when it is determined that an initially set running route makes it difficult to satisfy the test conditions because of a speed limit or the like, the running rout is changed on the way. In addition, to calculate a running route, the AI may also be inputted with the road traffic information to learn it, and made to perform the calculation.

Such road traffic information is one including congestion situations, construction situations, lane closure situations, and the like, and acquired from a website on the Internet through WIFI or a mobile phone line. In addition, another configuration may be to equip the vehicle V with an ICT terminal function, and acquire information concerning running situations and the like from another ICT terminal vehicle to acquire the road traffic information. A so-called a connected car system is used.

The presentation part 25 is one that provides a display output of a driving operation style and a running route calculated by the calculation part 24 on the display installed in the vehicle or provides an audio output of it.

Figure 3:
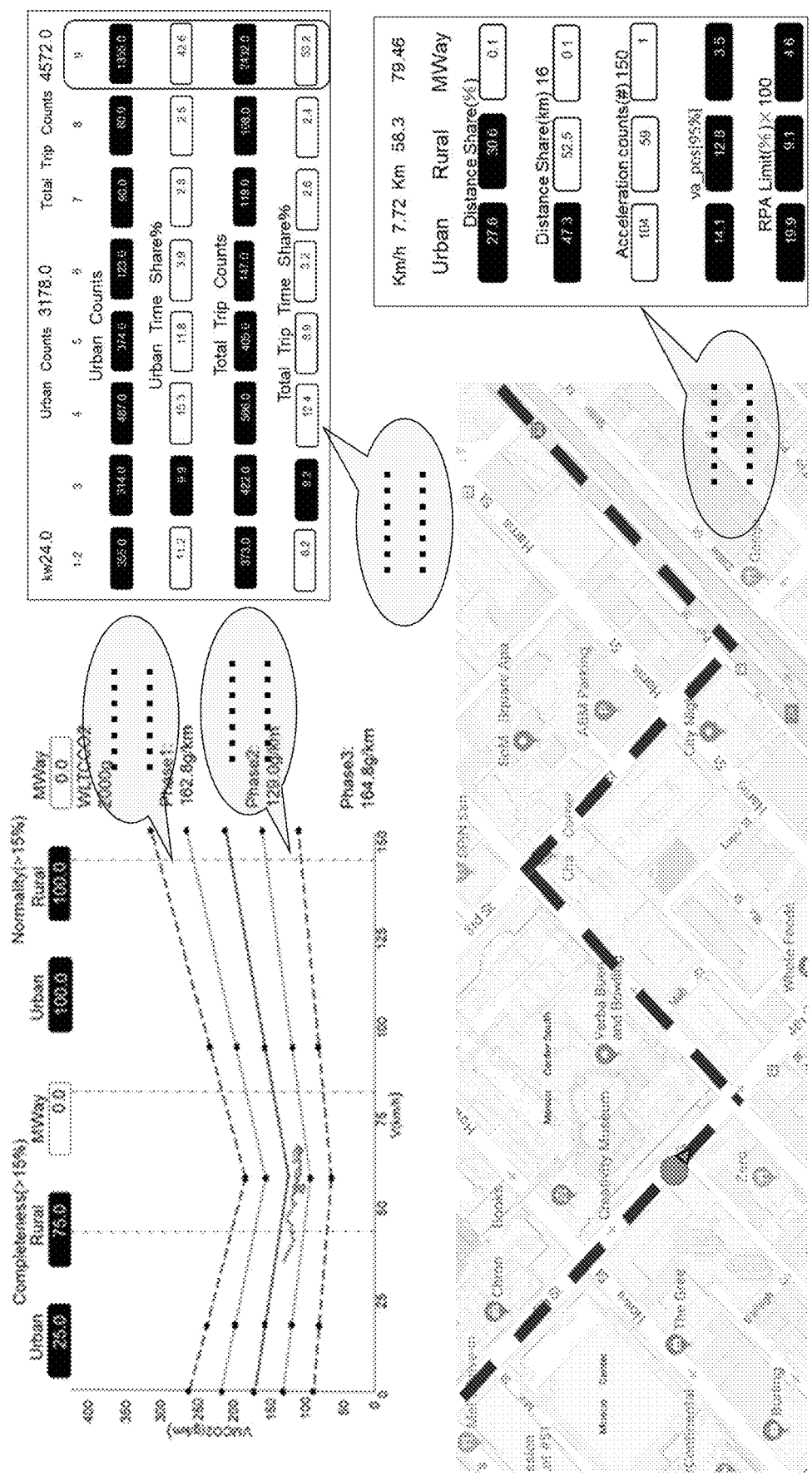
FIG. 3 is a screen diagram illustrating a screen displayed on a display in the same embodiment.
Figure 4:
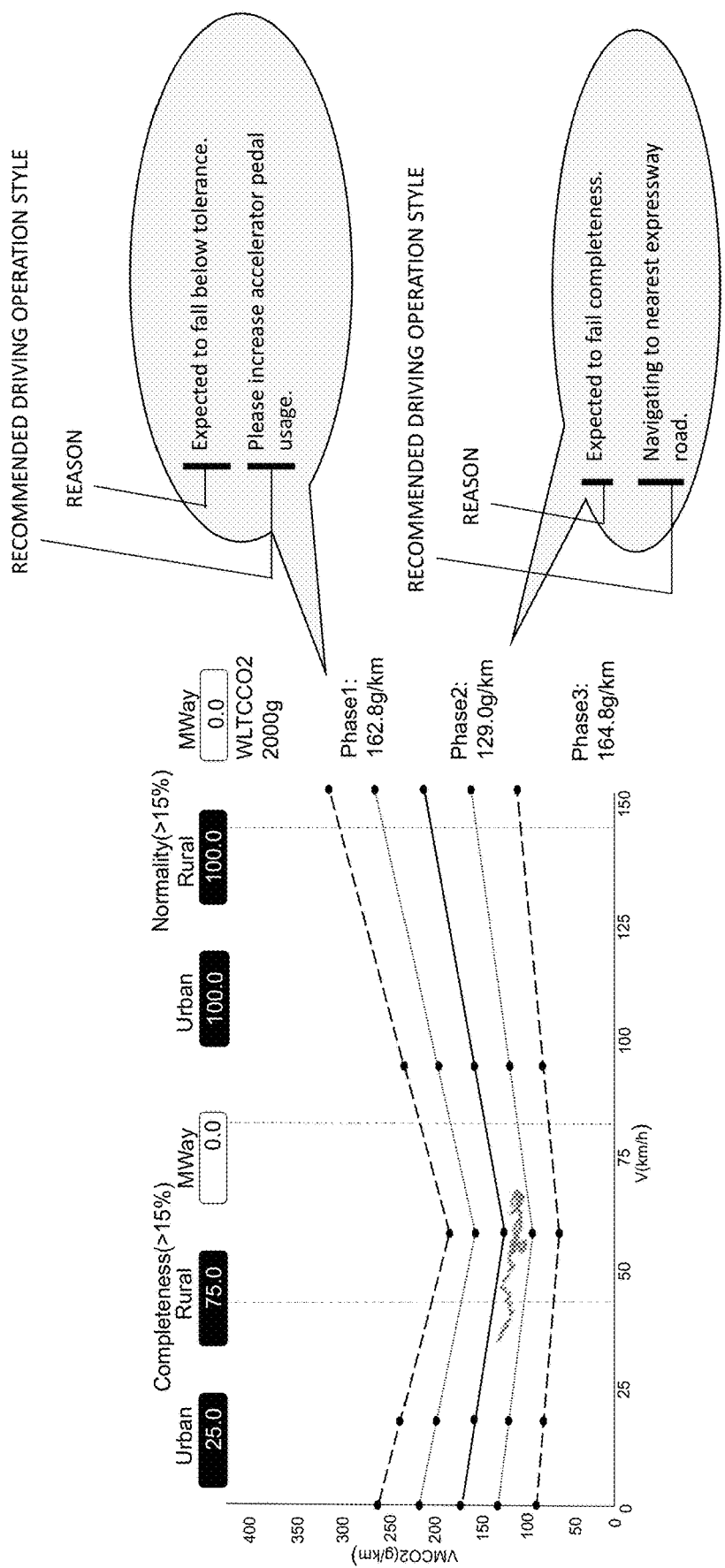
FIG. 4 is a screen diagram illustrating a part of the screen displayed on the display in the same embodiment.
Figure 5:
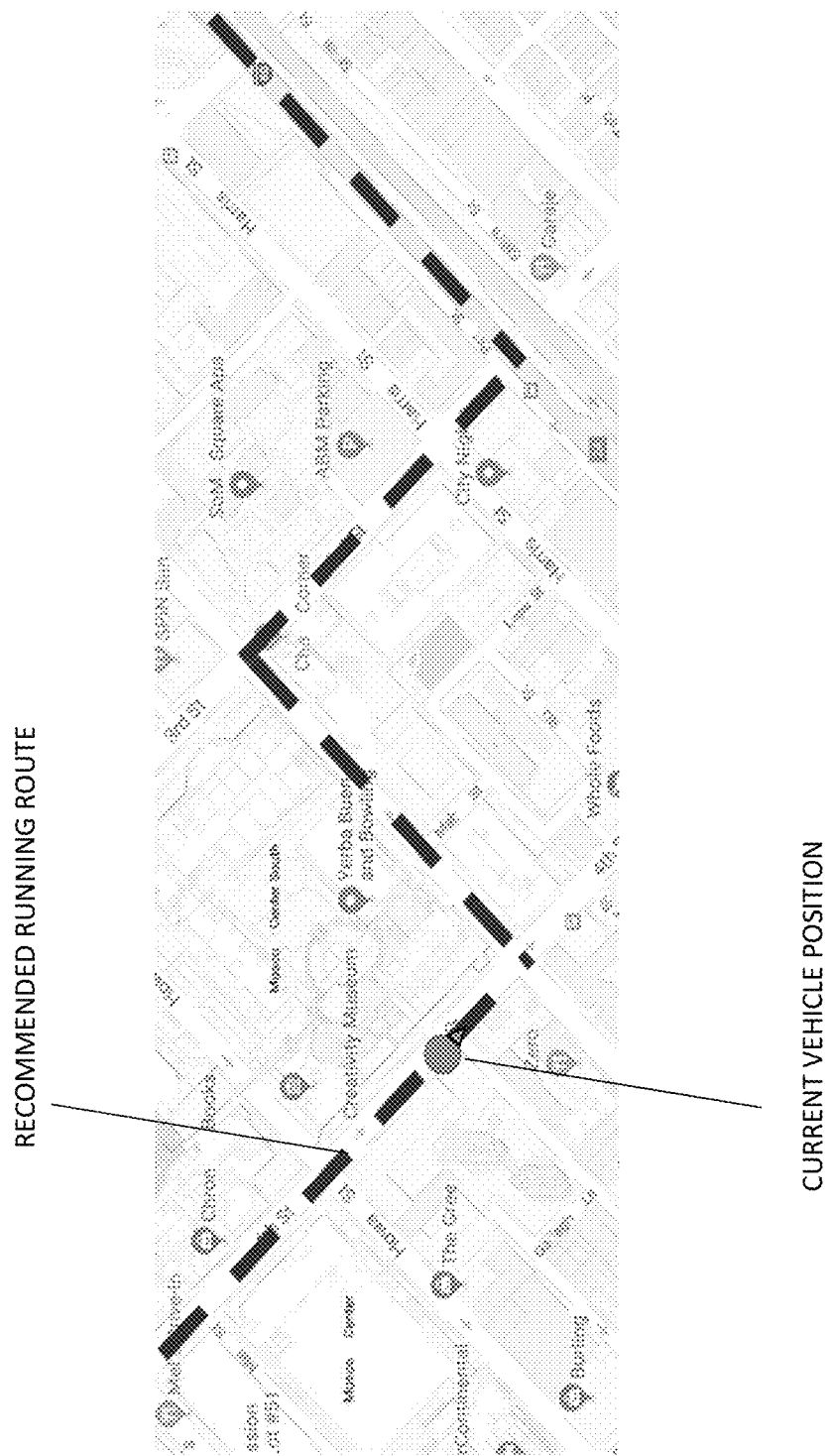
FIG. 5 is a screen diagram illustrating another part of the screen displayed on the display in the same embodiment.

A display example on the display is illustrated in FIG. 3, and partial details of a displayed screen are illustrated in FIGS. 4 and 5. On the display 22, in addition to a plot graph of calculation results by the MAW method, a numerical value display of calculated results by the power binning method, and a graph and numerical value display of the trip composition, the driving operation style (displayed, for example, in balloons here) and a running route map are simultaneously displayed on the same screen.

As the representation of the driving operation style, the driving operation style calculated by the calculation part 24 may be directly outputted as display or audio, or may be changed to representation easily understandable by the driver. In the former case, for example, when the calculation part 24 calculates a speed of 80 km as the recommended driving operation style, it is only necessary to directly display the speed, whereas when the calculation part 24 calculates the degree of stepping on the accelerator pedal to be 80% as the recommended driving operation style, directly presenting it is not easily understandable by the driver. Accordingly, if the current degree of stepping on the accelerator pedal is 30% since the difference between both is 50% representation such as "press down on the acceleration pedal" may be used. That is, depending on the difference between a current driving operation style and a recommended driving operation style, or depending on an operation object (acceleration pedal), the recommended driving operation style calculated by the calculation part 24 may be converted in terms of representation by combining some types of representation preliminarily set in a table or the like.

Also, as illustrated in FIG. 4, the recommended driving operation style is adapted to be attached with reasons for the recommendation and present them to the driver.

Next, the presentation timing of the driving operation style and running route by the presentation part 25 will be described.

Regarding the running route, at the start of the running test, the running route calculated by the calculation part 24 is first presented on the map. Then, the running test started. On the way; if the driver changes the running route for some reason or if the calculation part 24 determines that the initial running route prevents clearing the test conditions for some causes such as congestion, the calculation part 24 calculates a new running route at that timing, and the presentation part 25 presents the new running route on the map.

On the other hand, regarding the driving operation style, a recommended driving operation style is presented at regular intervals such as every 10 seconds or 1 minute. However, this may cause complicated presentation, and therefore other presentation timing is also considered.

For example, only when continuation of a current driving operation style may prevent satisfying the test conditions (only when the actual, driving operation style does not fall within the allowable range of a driving operation style calculated by the calculation part 24), the recommended driving style may be adapted to be presented.

Further, as described above, at the timing when the running route is changed, a driving operation style corresponding to the resulting running route may be adapted to be calculated and presented.

According to the present embodiment configured as described above, in the on-road exhaust gas certification test, a driving operation style and a running route recommended for satisfying the test conditions for the test L automatically calculated and presented to a driver, the driver can perform the on-road exhaust gas certification test easily and even alone without learning any special skills.

Besides, it goes without saying that the present invention is not limited to the above-described embodiment but can be variously modified without departing from the scope thereof.

REFERENCE SIGNS LIST

100: On-road running test system
V: Vehicle
10: Vehicle-mounted exhaust gas analyzer
20: Information processor
25: Presentation part
23: Running data acquisition part
24: Calculation part

The invention claimed is:
1. An on-road running test system comprising:
an exhaust gas analyzer, control unit, or sensor; and
a processor programmed to
successively acquire different types of actual running data on a vehicle on which a driver performs a running test on a road, wherein data output from the exhaust gas analyzer, the control unit, or the sensor is one of the types of actual running data,
compare predetermined test conditions for the running test and the types of actual running data to calculate a driving operation style including at least one of an accelerator operation mode, a brake operation mode, and a shift operation mode for satisfying the test conditions, and
present the driving operation style to the driver.

2. The on-road running test system according to claim 1, wherein
the processor is further programmed to calculate a running route for satisfying the test conditions, and present the running route to the driver.

3. The on-road running test system according to claim 2, wherein
the processor is further programmed to calculate a driving operation style or a running route for satisfying at least one of Trip Composition, Moving Averaging Window, and Standard Power Frequency among the test conditions.

4. The on-road running test system according to claim 1, wherein
the processor is further programmed to receive types of actual running data in multiple past running tests and evaluation values of the types of actual running data, and to perform machine learning of a correlation between them, and
the evaluation values are based on the test conditions.

5. The on-road running test system according to claim 4, wherein
the processor is further programmed to calculate the driving operation style on a basis of the correlation.

6. The on-road running test system according to claim 1, wherein
the processor is further programmed to, every time a running route is changed, calculate a driving operation style at a time of running on a resulting running route.

7. The on-road running test system according to claim 1, wherein
the processor is further programmed to determine a driving operation style depending on a surrounding road situation, and calculate a running route depending on a resulting driving operation style.

8. The on-road running test system according to claim 1, wherein
the processor is further programmed to output a calculation reason for a driving operation style, and to present the reason to the driver along with the driving operation style.

9. The on-road running test system according to claim 1, wherein
the exhaust gas analyzer is a vehicle-mounted exhaust gas analyzer.

10. A non-transitory program recording medium storing an on-road running test program instructing one or more computers to fulfill functions of:
outputting exhaust gas analyzer data, control unit data, or sensor data;
successively acquiring different types of actual running data on a vehicle on which a driver performs a running test on a road, wherein the exhaust gas analyzer data, the control unit data, or the sensor data is one of the types of actual running data;
comparing predetermined test conditions for the running test and the types of actual running data to calculate a driving operation style including at least one of an accelerator operation mode, a brake operation mode, and a shift operation mode for satisfying the test conditions; and
presenting the driving operation style to the driver.

11. An on-road running test method comprising:
outputting, by an exhaust gas analyzer, exhaust gas analyzer data, outputting, by a control unit, control unit data, or outputting, by a sensor, sensor data;
successively acquiring different types of actual running data on a vehicle on which a driver performs a running test on a road, wherein the exhaust gas analyzer data, the control unit data, or the sensor data is one of the types of actual running data;
comparing predetermined test conditions for the running test and the types of actual running data to calculate a direct driving operation style including at least one of an accelerator operation mode, a brake operation mode, and a shift operation mode for satisfying the test conditions; and
presenting the driving operation style to the driver.

* * * * *